(12) United States Patent
Shin et al.

(10) Patent No.: US 6,662,499 B1
(45) Date of Patent: Dec. 16, 2003

(54) SAFETY BEAM BRACKET AND METHOD OF ASSEMBLY

(75) Inventors: Mark Y. Shin, San Diego, CA (US); Dat Wai Law, Elk Grove, CA (US); Shiu Yuen Lee, Chai Wan (HK)

(73) Assignee: Linear Corporation, Calsbad, CA (US)

( * ) Notice: Subject to any disclaimer, the term of this patent is extended or adjusted under 35 U.S.C. 154(b) by 0 days.

(21) Appl. No.: 10/159,371

(22) Filed: May 31, 2002

(51) Int. Cl.[7] .............................................. E05F 15/02
(52) U.S. Cl. ........................... 49/26; 49/197; 248/298.1
(58) Field of Search .............................. 49/26, 28, 197, 49/199, 506; 248/298.1

(56) References Cited

U.S. PATENT DOCUMENTS

| | | | |
|---|---|---|---|
| 3,247,893 A | 4/1966 | Ford | |
| 4,363,459 A | 12/1982 | Holzer | |
| 4,593,491 A | 6/1986 | Carlson et al. | |
| 5,327,680 A | 7/1994 | Miller | |
| 5,407,161 A | * 4/1995 | Mulkeran | 248/232 |
| 5,529,273 A | 6/1996 | Benthin | |
| 5,934,019 A | * 8/1999 | Rotharmel et al. | 49/28 |
| 5,937,578 A | 8/1999 | Dolan et al. | |
| 6,011,469 A | 1/2000 | Taft et al. | |
| 6,082,046 A | 7/2000 | Simmons | |
| 6,176,039 B1 | 1/2001 | Craig | |
| 6,509,561 B1 | * 1/2003 | Scott | 49/26 |

* cited by examiner

Primary Examiner—Jerry Redman
(74) Attorney, Agent, or Firm—Hogan & Hartson, LLP

(57) ABSTRACT

A mounting system for the safety beam units of a garage door opener, the mounting system having two brackets, each bracket having a base with a circular opening and a support, the supports of both brackets being adjustably coupleable together. The mounting system also has a beam unit housing with a cylindrical mounting base fittable through the circular opening in the base of at least one of the brackets. A spring is coupled to the cylindrical mounting base, the spring having at least one end extending beyond a side of the cylindrical mounting base. The beam unit housing being held in position by the at least one spring end extending into contact with the base of least one bracket.

19 Claims, 5 Drawing Sheets

SAFETY BEAM BRACKET AND METHOD OF ASSEMBLY

BACKGROUND OF THE INVENTION

The present invention is directed to electronic garage door openers and, more particularly, to a safety beam bracket and method of assembly for an electronic garage door safety beam.

In order to prevent the closing of a garage door upon an obstruction, it is known in the art to pass a sensor beam across the garage door opening. Usually, the sensor beam is oriented in a direction generally parallel to the garage floor. Passage of the beam across the garage door opening is monitored, and when the beam is broken, an electronic garage door controller either stops the electric motor moving the door or reverses the direction of the motor to move the door back upward.

It is desirable to have the beam mounted within approximately one foot of the garage floor so that small children and pets in danger of being hit by the door will break the beam. It is also desirable to have the beam mounted some distance off of the garage floor to prevent the path from being obstructed by contaminants such as moisture, dirt and road salt. In some areas, the height of the beam is mandated by legislation to be a particular distance off of the garage floor.

Commonly, brackets are used to hold both the beam transmitter and the beam receiver. Installation of the brackets to be at a proper height is often a difficult and time consuming process. Likewise, attachment of the beam transmitter and the beam receiver to the brackets and alignment of the beam transmitter and the beam receiver is often a time and labor intensive process. There is a need for a an improved safety beam mounting system to reduce the difficulty and time needed for installation of a garage door opener safety beam system.

SUMMARY OF THE INVENTION

A mounting system for the safety beam units of a garage door opener according to an exemplary embodiment of the present invention has two brackets. Each bracket has a base with a circular opening, and a support. The supports of both brackets are adjustably coupleable to each other. The mounting system also has a beam unit housing with a cylindrical mounting base fittable through the circular opening in the base of at least one of the brackets. A spring is coupled to the cylindrical mounting base. The spring has at least one end extending beyond a side of the cylindrical mounting base. The beam unit housing is held in position by the spring end extending into contact with the base of least one bracket.

In an embodiment, the spring is a leaf spring, the spring is coupled to a center of the cylindrical mounting base, and the spring has two pointed ends extending into contact with the base of at least one bracket. The base has a plurality of detents; and the spring end is held in at least one of the detents. The base of at least one bracket also has at least one receiving gap in communication with the circular opening. The end of the spring is insertable through the receiving gap. Additionally, the base of at least one bracket has a plurality of mounting holes.

The support of each bracket has a notch and a retaining clip. The retaining clip of each support is insertable into the notch of the other support. The two supports are coupled to each other by a fastener. Additionally, the support of each bracket has a plurality of measuring guide markers. In an embodiment, each of the brackets is made from a single piece of resilient metal folded to form the base and the support, and the fold has a plurality of gussets.

BRIEF DESCRIPTION OF THE DRAWINGS

Other features and advantages of the present invention will become apparent from the following detailed description, taken in conjunction with the accompanying drawings, in which.

DETAILED DESCRIPTION

A mounting system according to an exemplary embodiment of the present invention is adapted for achieving simple, inexpensive mounting of a safety beam emitter and a safety beam receiver.

Figure 1:
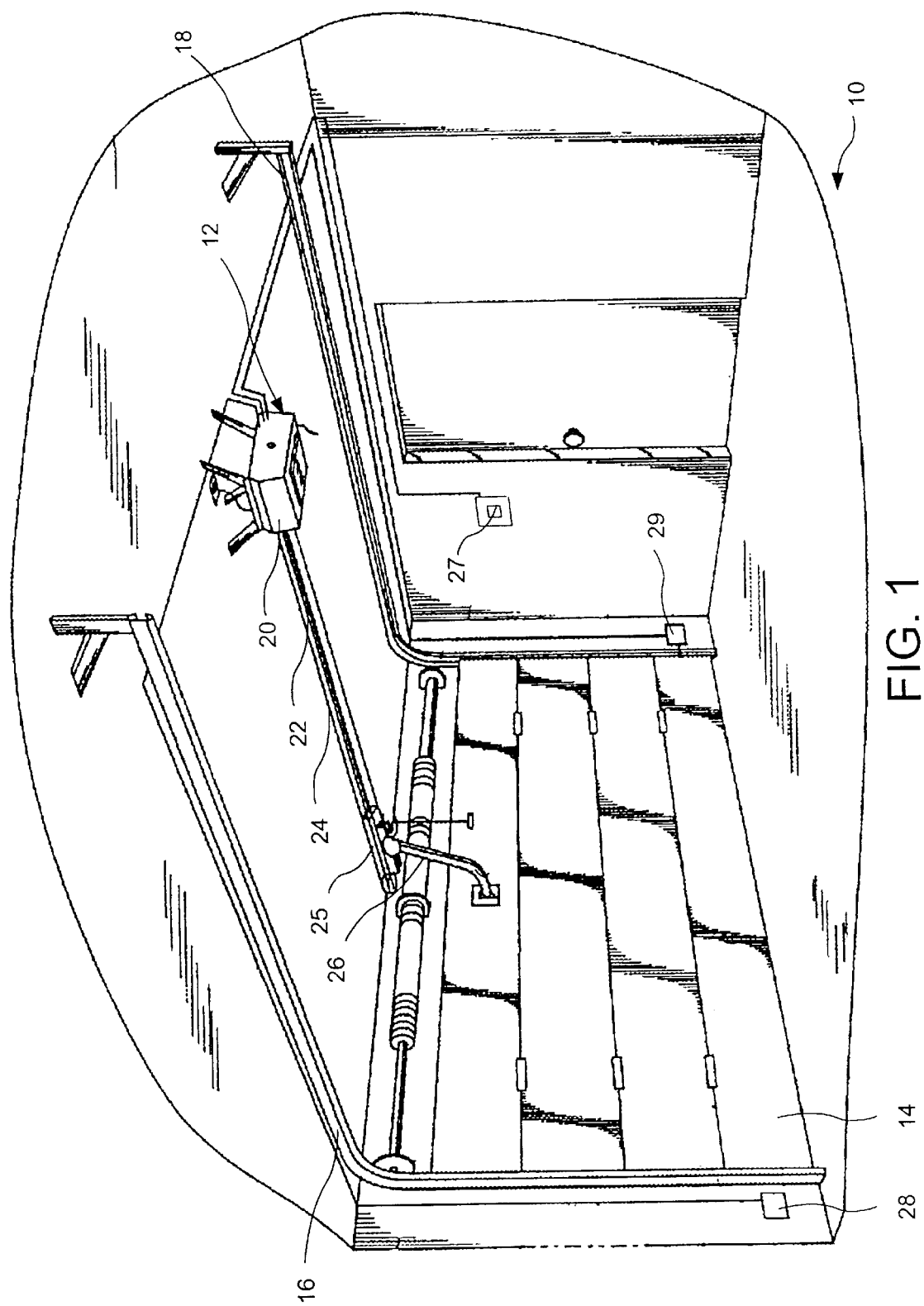
FIG. 1 is a perspective view of an interior of a garage showing a garage door and an electronic garage door opening system.

As shown in FIG. 1, a garage door opener system 10 has a garage door opener 12 coupled to a garage door 14. An exemplary garage door 14 is sectional and is mounted for travel on a pair of rails 16, 18. The garage door opener has a drive unit 20 coupled to a chain 22. The chain 22 extends along a T-rail 24 mounted from the drive unit 20 and extending longitudinally to a point above the garage door. The T-rail has laterally extending flanges. A drive assembly 25 is releasably coupled to the chain 22. The chain 22 is driven by the drive unit, and the drive assembly 25 is driven along the T-rail 24 by the chain 22. A linkage arm 26 is coupled to the drive assembly 25 and to the garage door 14. As the drive assembly 25 is driven along the T-rail 24, the arm 26 causes the garage door 14 to be raised or lowered. A switch 27 activates the drive unit 20. A safety beam emitter 28 and a safety beam receiver 29 are electrically coupled to the drive unit 20 and may stop the drive unit 20 to prevent the garage door 14 from closing on an obstruction.

Figure 2:
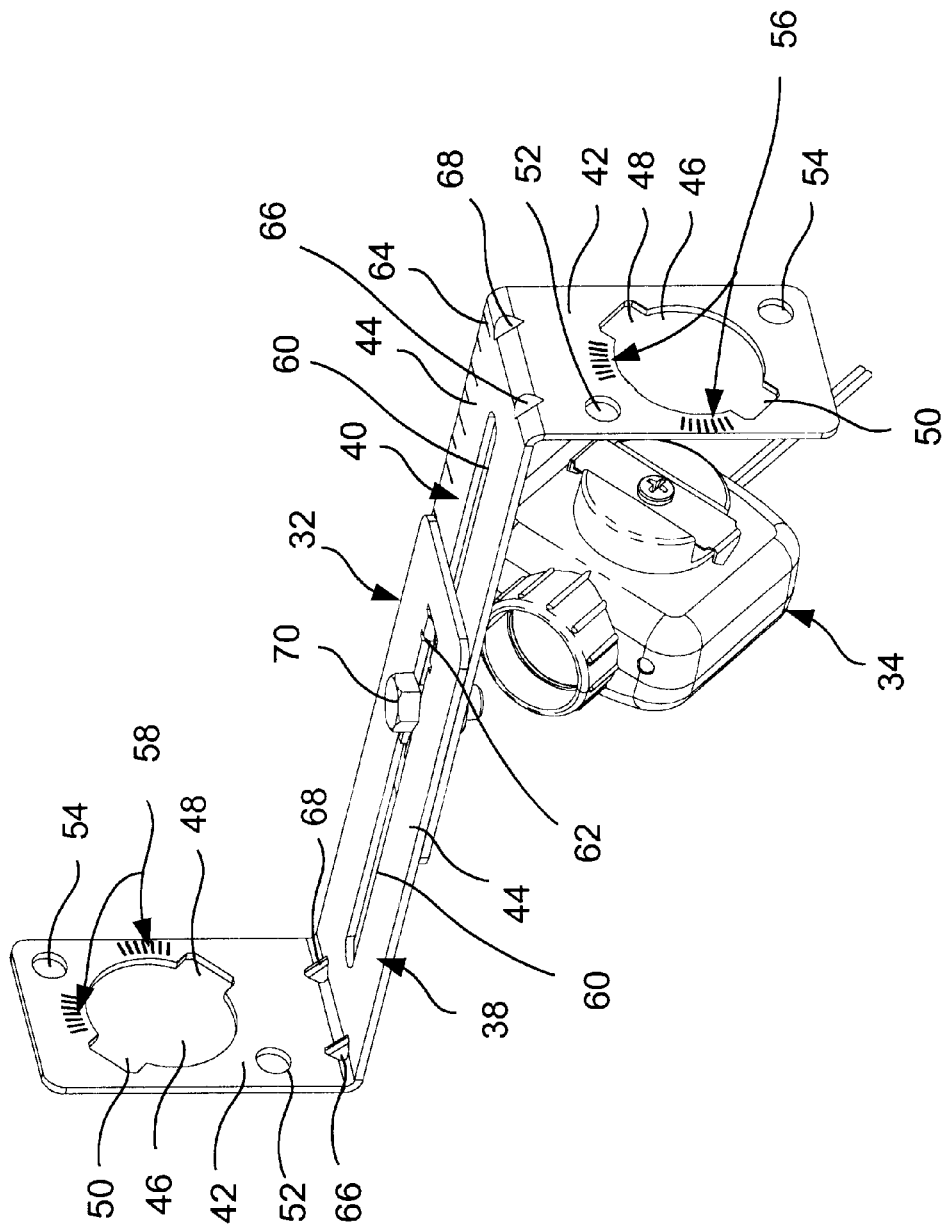
FIG. 2 is a perspective view of a mounting system where the beam emitter/sensor is unattached to the brackets according to an exemplary embodiment of the present invention.

As shown in FIG. 2, the mounting system has a mount 32 and a safety beam emitter/receiver housing 34. The safety beam emitter 28 and the safety beam receiver 29 are each enveloped in a separate housing 34, and each housing 34 fits into a separate mount 32. Typically, a first mount and a safety beam emitter are placed on one side of a garage door opening. A second mount and a safety beam receiver are placed on an opposite side of the garage door opening.

Each mount 32 contains two brackets 38, 40. The two brackets 38, 40 are identical and fit together to form the mount 32. Each bracket has a base 42 and a support 44 oriented perpendicular to the base 42. The two brackets 38, 40 are assembled so that one base is mountable against a surface and the other base is used to mount the beam emitter/receiver housing 34.

The base 42 has a circular opening 46. The circular opening 46 has two receiving gaps 48, 50 located on opposite sides of the circular opening 46. The base 42 also has two mounting holes 52, 54 for attachment to a surface, such as a floor or a wall. Additionally, the base 42 has two sets of detents 56 positioned adjacent to portions of the circular opening on a first side, and second sets of detents 58 positioned adjacent to portions of the circular opening on a second side.

The support 44 has an oblong notch 60 extending along a portion of its length. At an end of the notch 60 farthest from the base 42, the support 44 has a retaining clip 62 that extends through the notch 60. The retaining clip 62 is formed by two tabs. The two tabs are oriented to have an external width approximately equal to the width of the notch 60. Along the length of the support 44 are indented measurement markings 64.

In an exemplary embodiment of the present invention, a bracket is made from a single piece of material. In an embodiment, the bracket is made from a strip of suitable metal such as aluminum, steel, or stainless steel. The strip is stamped on a first side with the measurement markings 64 for the support and with the first sets of detents 56 on the first side of the base. The strip is stamped on a second side with the ,second set of detents 58 for the second side of the base. The strip is also stamped on the second side to create the retaining clip 62.

The circular opening 46, two receiving gaps 48, 50, mounting holes 52, 54 and notch 60 are punched out of the strip. The strip is bent to form the base and the support. The corner of the bend is stamped to form two gussets 66, 68. In an alternative embodiment, the bracket is made of plastic. The plastic is molded to obtain the desired features. In another embodiment, the bracket is made by coupling a base to a support.

Figure 3:
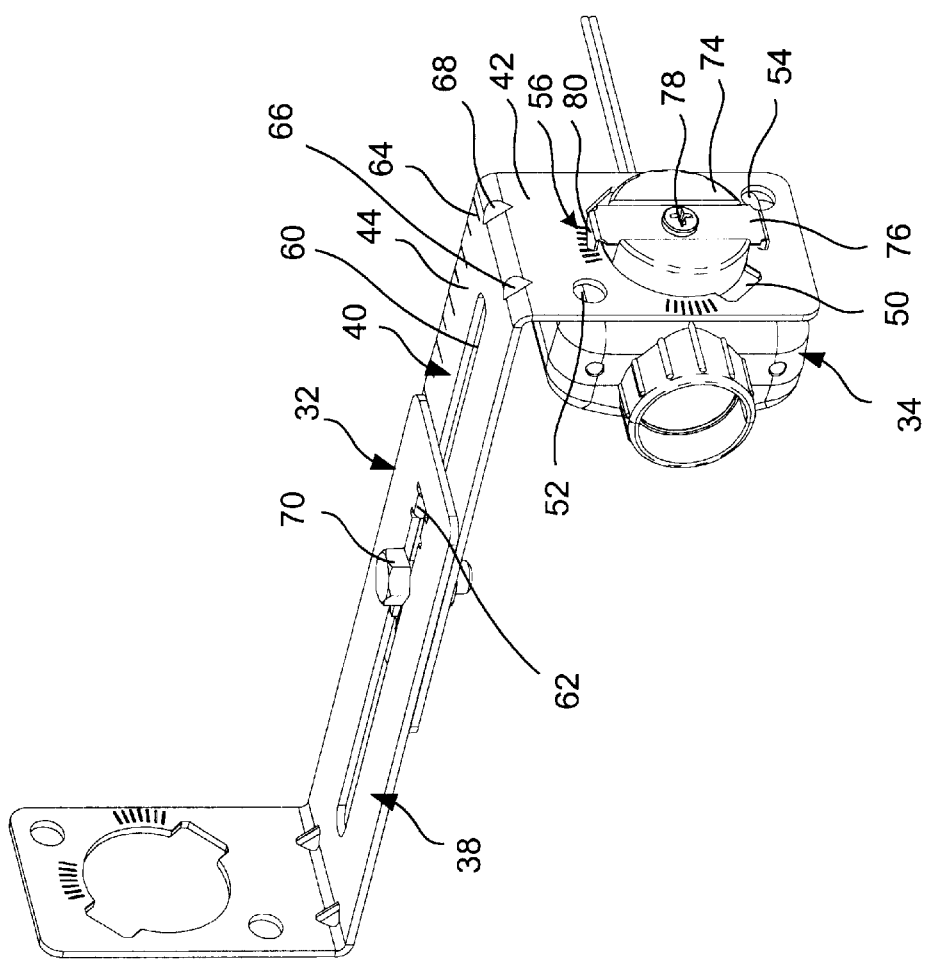
FIG. 3 is a perspective view of a mounting system where the beam emitter/sensor is attached to the inside of the brackets according to an exemplary embodiment of the present invention.
Figure 4:
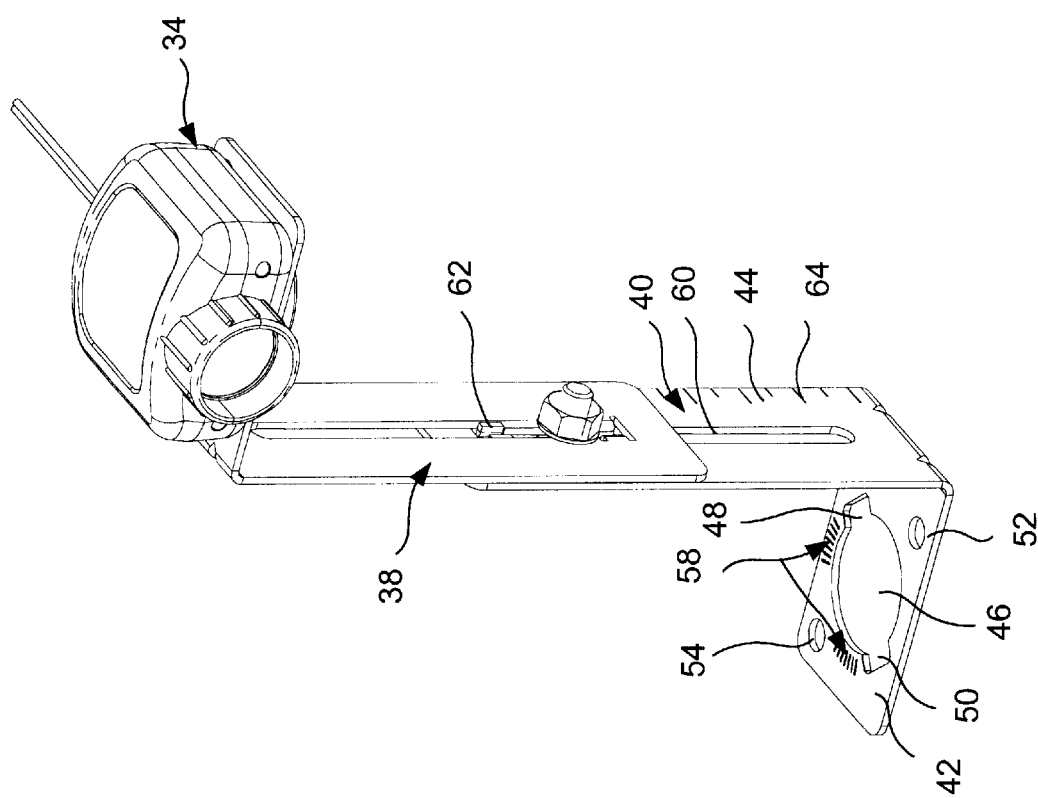
FIG. 4 is a perspective view of a mounting system where the beam emitter/sensor is attached to the outside of the brackets and according to an exemplary embodiment of the present invention.

As shown in FIGS. 2 to 4, the mount 32 is assembled by facing the brackets 38, 40 in opposite directions with the bases pointing away from each other. The two supports are lined up so that the two notches are superimposed. Each retaining clip is placed in the notch of the other bracket. The retaining clips maintain alignment of the supports. Although the retaining clips can slide along the length of the notch, the width of the retaining clips prevent the notches from being rotated relative to each other. The supports are moveable to obtain a desired length between the two bases. An exact measurement of the distance between the two bases may be achieved by lining up an end of one support with the measurement markings 64 on the other support.

Once the proper distance between the two bases has been achieved, a fastener 70 is placed through both notches and secured. In an embodiment, the fastener is a nut and bolt. In an additional embodiment, a lock washer is placed on the bolt prior to the nut, to prevent vibration from loosening the nut. One of the bases 42 is attached to a desired surface, and the other base is available for attachment of the beam emitter/receiver housing 36.

Figure 5:
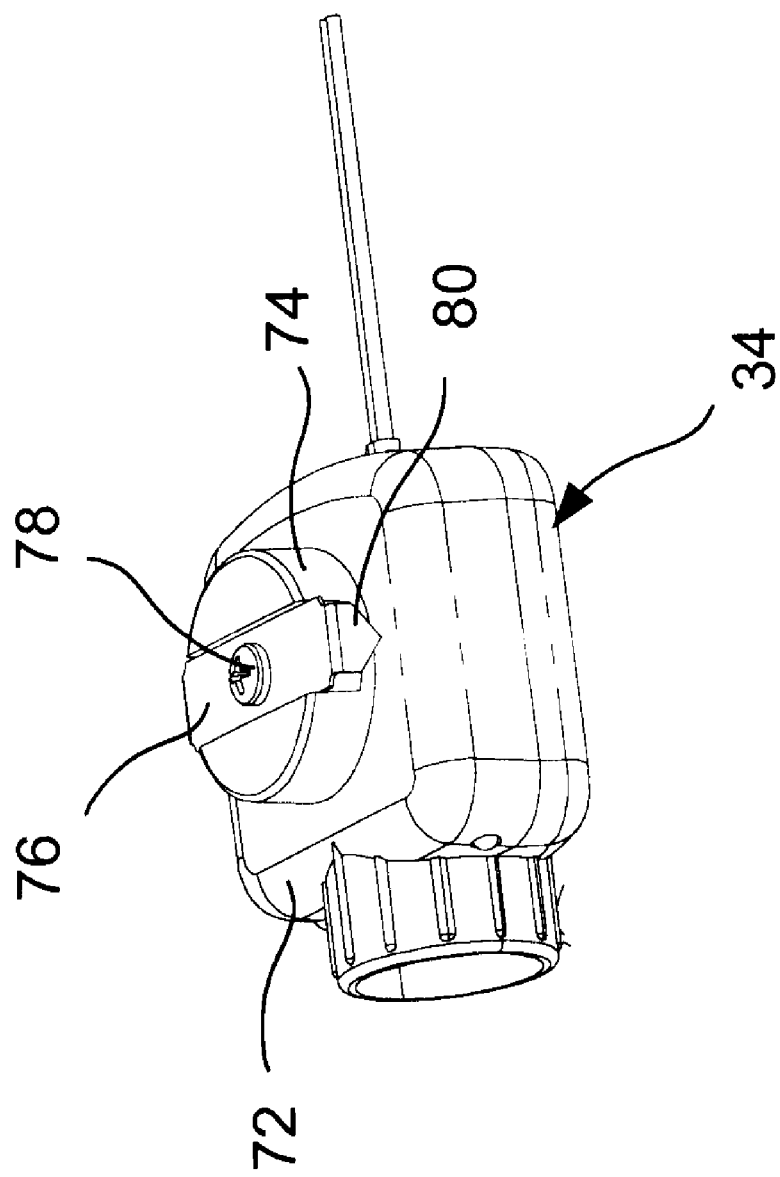
FIG. 5 is a perspective view of a beam emitter/receiver housing according to an exemplary embodiment of the present invention.

As shown in FIG. 5, the beam emitter/receiver housing 34 has a body 72 and a raised cylindrical mounting base 74. The diameter of the cylindrical mounting base 74 corresponds to the diameter of the circular opening 46 in the base of each bracket. The circular opening 46 fits over the mounting base 74 with little play. In an embodiment of the present invention, the housing 34 and the cylindrical mounting base 74 are a unitary piece made of molded plastic.

A spring clip 76 is coupled to an outer surface of the cylindrical mounting base 54 using a fastener 78. In an embodiment, the fastener 78 coupling the spring clip to the mounting base is a screw. The spring clip 76 extends beyond the outer diameter of the mounting base 74. The ends of the spring clip 76 are pointed flanges 80, pointing toward the body 72 of the beam emitter/receiver housing 34. In an exemplary embodiment of the present invention, the spring clip 76 is a leaf spring made of a resilient metal, such as steel or stainless steel.

To couple the beam emitter/receiver housing 34 to the mount 32, the housing 34 is rotated until the spring clip 76 is aligned with the two receiving gaps 48, 50 on the base. The spring clip 76 and the mounting base 74 are inserted into the receiving gaps 48, 50 and the circular opening 46 respectively. Once inserted, the housing 34 is rotated so that the spring clip 76 cannot fit back through the receiving gaps 48, 50. The housing 34 is rotated so that the pointed flanges 80 pass over the detents located on the base until the housing 34 is at a desired orientation within the mount 32. Once at the desired orientation, the resting of one of the pointed flanges 80 in a detent holds the beam housing 34 in the desired orientation.

The mount may be attached to different surfaces in different orientations. For example, as shown in FIG. 3, the mount may be attached to a vertical surface, such as a garage wall. Alternatively, as shown in FIG. 4, the mount may be attached to a horizontal surface such as a garage floor.

The beam emitter/receiver housing 34 may be coupled to the mount in different orientations. For example, as shown in FIG. 3, the housing 34 may be attached in an inside orientation. In an inside orientation, the housing 34 is inserted into the circular opening 46 of the base 42 from the side of the base closest to the mounting surface. Alternatively, as shown in FIG. 4, the housing 34 may be attached in an outside orientation. In the outside orientation, the housing 34 is inserted into the circular opening 46 of the base from the side of the base facing away from the mounting surface.

Although references have been made in the foregoing description to an exemplary embodiment, persons of ordinary skill in the art of designing garage door openers will recognize that insubstantial modifications, alterations, and substitutions can be made to the exemplary embodiment described without departing from the invention as claimed in the accompanying claims.

What is claimed is:

1. A mounting system for safety beam units of a garage door opener, the mounting system comprising:

two brackets, each bracket having a base with a circular opening and a support, the supports of both brackets being adjustably coupleable together;

a beam unit housing having a cylindrical mounting base fittable through the circular opening in the base of at least one of the brackets; and a spring coupled to the cylindrical mounting base, the spring having at least one end extending beyond a side of the cylindrical mounting base;

wherein the beam unit housing is held in position by the at least one end of the spring extending into contact with the base of at least one of the two brackets.

2. The mounting system of claim 1 wherein:

the spring is a leaf spring;

the spring is coupled to a center of the cylindrical mounting base; and the spring has two pointed ends extending into contact with the base of at least one bracket.

3. The mounting system of claim 1 wherein:
the base of at least one bracket has a plurality of detents; and
the at least one end of the spring is held in at least one of the plurality of detents.

4. The mounting system of claim 1 wherein:
the base of at least one bracket further comprises at least one receiving gap in communication with the circular opening; and
the at least one end of the spring is insertable through the at least one receiving gap.

5. The mounting system of claim 1 wherein the base of at least one bracket further comprises a plurality of mounting holes.

6. The mounting system of claim 1 wherein:
the support of each bracket further comprises a notch and a retaining clip; and
the retaining clip of each support is insertable into the notch of the other support.

7. The mounting system of claim 6 wherein the two supports are coupled to each other by a fastener.

8. The mounting system of claim 6 wherein the support of each bracket further comprises a plurality of measuring guide markers.

9. The mounting system of claim 1 wherein each of the brackets is made from a single piece of resilient metal folded to form the base and the support; and
the fold has a plurality of gussets.

10. A method for mounting a garage door safety beam unit using two identical brackets, each bracket having a support and a base oriented perpendicularly to the support, the safety beam unit having a circular mounting base with a spring coupled to the circular mounting base, the method comprising:
aligning the supports of the brackets upside down and backward to each other;
coupling the supports together;
aligning the circular mounting base with a circular opening in the base of one of the brackets;
aligning an end of the spring attached to the circular mounting surface with a receiving gap in communication with the circular opening in the base of one of the brackets;
inserting the circular mounting surface into the circular opening and the spring end through the receiving gap; and
locking the safety beam unit to the base of one of the brackets by rotating the safety beam unit until the spring end is no longer aligned with the receiving gap.

11. The method of claim 10 further comprising adjusting the safety beam unit to a desired angle by rotating the safety beam unit until the spring end engages a detent on the base of one of the brackets.

12. The method of claim 10 wherein coupling the supports together further comprises:
inserting a retaining clip on the support of each bracket into a notch on the other bracket; and
affixing a fastener through both supports.

13. The method of claim 12 further comprising adjusting the safety beam unit to a desired distance from a surface by sliding the supports of the brackets relative to each other until an end of one support is at a selected guide marker located on the other support.

14. A mounting system for safety beam units of a garage door opener, the mounting system comprising:

two brackets, each bracket having a base with a circular opening, and a plurality of detents positioned adjacent to the circular opening, and a support, the supports of both brackets being adjustably coupleable together;
a beam unit housing having a cylindrical mounting base fittable through the circular opening in the base of at least one of the brackets;
a leaf spring coupled to the center of the cylindrical mounting base and extending outside of the cylindrical mounting base, the spring having two perpendicular pointed ends wherein the beam unit housing is held in position by at least one pointed spring end extending into contact with one of the plurality of detents on the base of at least one of the two brackets.

15. The mounting system of claim 14 wherein:
the base of each mounting bracket further comprises two receiving gaps in communication with the circular opening; and
the two ends of the leaf spring are insertable into the receiving gaps.

16. The mounting system of claim 15 wherein:
the support of each bracket further comprises a notch and a retaining clip; and
the retaining clip on each support is insertable into the notch of the other support.

17. The mounting system of claim 16 further comprising a bolt extending through the notches of both supports and a nut attached to the bolt.

18. A safety beam system electrically coupled to an electronic garage door opener for a garage having a door, walls and a floor, the garage door opener being coupled to the garage door, the safety beam system comprising:
a beam emitter enclosed in a first housing coupled to a first mount located on a first side of the garage door; and
a beam receiver enclosed in a second housing coupled to a second mount located on a second side of the garage door;
wherein each of the first mount and the second mount comprises a first bracket and a second bracket, each bracket having a base with a circular opening and a support, the supports of the first bracket and the second bracket being adjustably coupled together;
each of the first housing and the second housing comprises:
a cylindrical mounting base fitted through the circular opening in the base of the first bracket of one of the first mount and the second mount; and
a spring coupled to the cylindrical mounting base, the spring having at least one end extending beyond a side of the cylindrical mounting base into contact with the base of the first bracket of one of the first mount and the second mount;
the second base of the first mount is coupled to the floor of the garage; and
the second base of the second mount is coupled to the floor of the garage.

19. A safety beam system electrically coupled to an electronic garage door opener for a garage having a door, walls and a floor, the garage door opener being coupled to the garage door, the safety beam system comprising:
a beam emitter enclosed in a first housing coupled to a first mount located on a first side of the garage door; and
a beam receiver enclosed in a second housing coupled to a second mount located on a second side of the garage door;

wherein each of the first mount and the second mount comprises a first bracket and a second bracket, each bracket having a base with a circular opening and a support, the supports of the first bracket and the second bracket being adjustably coupled together;

each of the first housing and the second housing comprises:

a cylindrical mounting base fitted through the circular opening in the base of the fist bracket of one of the first mount the second mount; and a spring coupled to the cylindrical mounting base, the spring having at least one end extending beyond a side of the cylindrical mounting base into contact with the base of the first bracket of one of the first mount and the second mount;

the second base of the first mount is coupled to the wall of the garage adjacent to the garage door; and the second base of the second mount is coupled to the wall of the garage adjacent to the garage door.

* * * * *